United States Patent
Ozserin et al.

(10) Patent No.: US 11,600,115 B2
(45) Date of Patent: Mar. 7, 2023

(54) BARCODE SCANNING BASED ON GESTURE DETECTION AND ANALYSIS

(71) Applicant: ZEBRA TECHNOLOGIES CORPORATION, Lincolnshire, IL (US)

(72) Inventors: Ozgur Ozserin, London (GB); Luke Walton, Bromley (GB)

(73) Assignee: Zebra Technologies Corporation, Lincolnshire, IL (US)

( * ) Notice: Subject to any disclaimer, the term of this patent is extended or adjusted under 35 U.S.C. 154(b) by 213 days.

(21) Appl. No.: 16/928,836

(22) Filed: Jul. 14, 2020

(65) Prior Publication Data
US 2022/0019780 A1  Jan. 20, 2022

(51) Int. Cl.
G06V 40/20    (2022.01)
G06K 7/10     (2006.01)
G06K 7/14     (2006.01)
G06V 10/25    (2022.01)

(52) U.S. Cl.
CPC ......... G06V 40/28 (2022.01); G06K 7/10722 (2013.01); G06K 7/1413 (2013.01); G06V 10/25 (2022.01)

(58) Field of Classification Search
CPC ........ G06V 40/28; G06V 10/25; G06V 40/00; G06K 7/10722; G06K 7/1413; G06F 3/00
See application file for complete search history.

(56) References Cited

U.S. PATENT DOCUMENTS

| | | |
|---|---|---|
| 2013/0057642 A1 | 3/2013 | Catchpole |
| 2014/0247278 A1 | 9/2014 | Samara et al. |
| 2018/0157336 A1 | 6/2018 | Harris et al. |
| 2018/0373327 A1* | 12/2018 | Todeschini ........... G02B 27/017 |
| 2019/0171250 A1 | 6/2019 | Burch |
| 2019/0188433 A1 | 6/2019 | Todescato et al. |
| 2019/0196202 A1 | 6/2019 | Todeschini |
| 2019/0220640 A1* | 7/2019 | Xu ....................... G06K 7/1417 |

OTHER PUBLICATIONS

International Search Report and Written Opinion for International Application No. PCT/US2021/038417 dated Sep. 28, 2021.

* cited by examiner

*Primary Examiner* — John B Strege

(57) ABSTRACT

A system for decoding a barcode based on gesture detection and analysis is disclosed herein. The system may receive an image stream of an environment. The system may determine, based on processing images of the image stream, a gesture region of the image stream. The system may detect a gesture, by a user, based on analyzing the gesture region. The system may determine a barcode region of the image stream based on a position of the user when performing the gesture. The system may identify a barcode in the environment based on analyzing the barcode region. The system may decode the barcode based on a format of the barcode.

20 Claims, 6 Drawing Sheets

BARCODE SCANNING BASED ON GESTURE DETECTION AND ANALYSIS

BACKGROUND

Barcodes can be associated with various types of objects to provide or permit information to be obtained about the objects using a barcode scanner. In some cases, a user can use a manual barcode scanner to scan a barcode. The manual barcode scanner, which is held by or attached to a hand or arm of the user, typically requires the use of one or both of the user's hands to perform the scan (e.g., to trigger the scan and/or to manipulate a position of the manual barcode scanner and/or the object). Often, the user is engaged in other activities involving the object while the user is to scan the barcode on the object. Therefore, there is a need for an accurate barcode scanner system that frees up the user's hands to permit the user to more readily and easily perform the other activities without having to set down or pick up the barcode scanner between scans.

SUMMARY

In some implementations, a method includes receiving an image stream that depicts an environment; monitoring, using an image processing model, the image stream to detect a set of gestures in the environment; determining, using the image processing model, that a first section of the image stream depicts a first gesture of the set of gestures; determining, using the image processing model, that the first gesture is associated with indicating a barcode region of the image stream; analyzing, using the image processing model, the barcode region of the image stream to identify a barcode; determining, using the image processing model, that a second section of the image stream depicts a second gesture of the set of gestures that is associated with decoding the barcode; decoding the barcode based on determining that the second section of the image stream depicts the second gesture; and performing an action associated with an object that is associated with the barcode.

In some implementations, a device includes one or more memories; and one or more processors, communicatively coupled to the one or more memories, configured to: receive an image stream that depicts an environment; monitor, using an image processing model, the image stream to detect a set of gestures in the environment; determine, using the image processing model, that a first section of the image stream depicts a first gesture of the set of gestures; determine, using the image processing model, that the first gesture is associated with indicating a barcode region of the image stream; analyze, using the image processing model, the barcode region of the image stream to identify a barcode that is in the environment; determine, using the image processing model, that a second section of the image stream depicts a second gesture of the set of gestures that is associated with decoding the barcode; and decode the barcode based on the image stream depicting the second gesture.

In some implementations, a tangible machine-readable medium storing instructions includes one or more instructions that, when executed by one or more processors of a device, cause the device to: receive an image stream of an environment; determine, based on processing images of the image stream, a gesture region of the image stream; detect a gesture, by a user, based on analyzing the gesture region; determine a barcode region of the image stream based on a position of the user when performing the gesture; identify a barcode in the environment based on analyzing the barcode region; and decode the barcode based on a format of the barcode.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate implementations of concepts disclosed herein, and explain various principles and advantages of those implementations.

Figure 1:
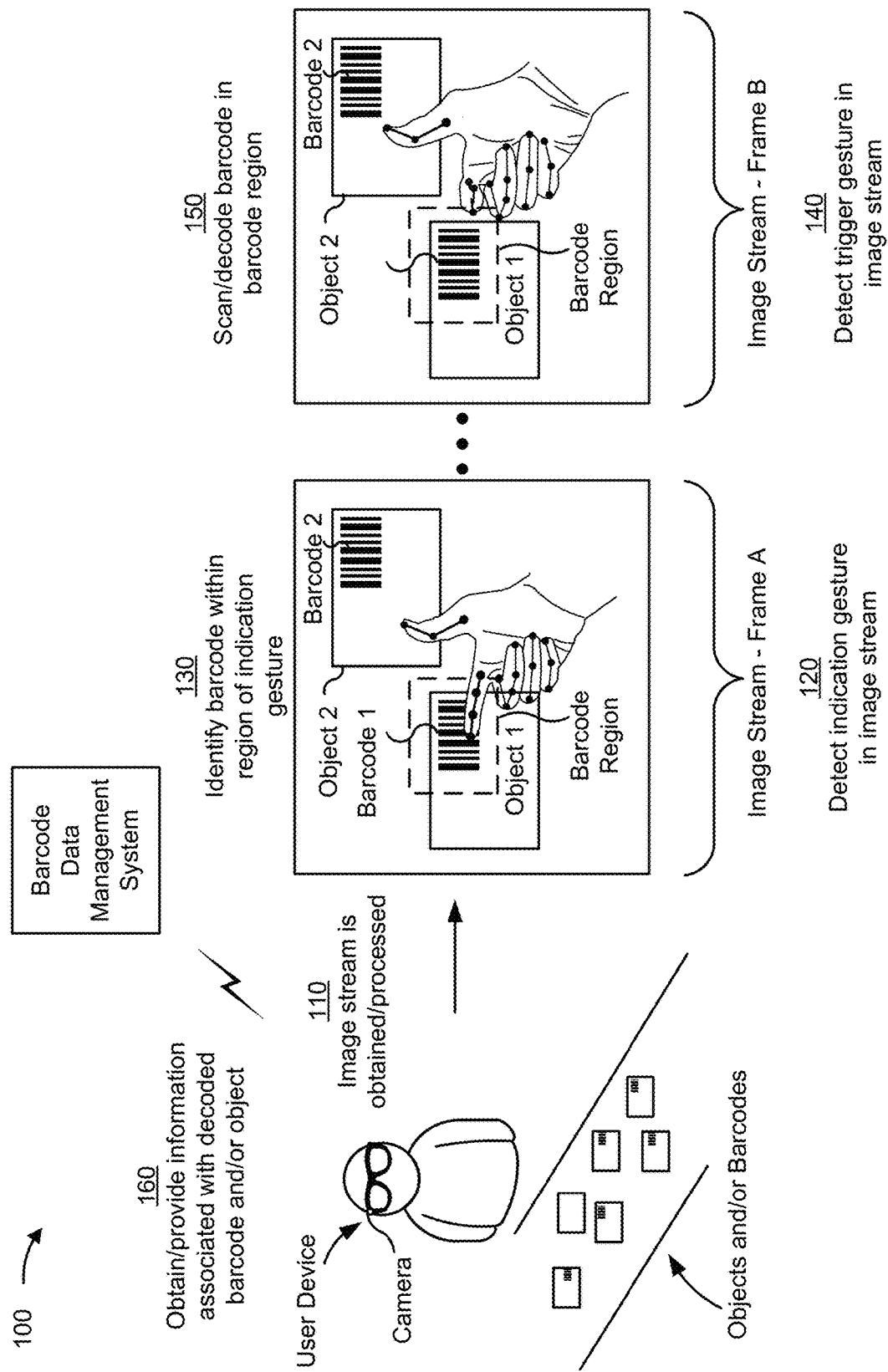
FIG. 1 is a diagram of an example implementation described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations described herein.

The apparatus and method elements have been represented where appropriate by conventional symbols in the drawings, showing only those specific details that are pertinent to understanding the implementations described herein so as not to obscure the disclosure with details that will be readily apparent to those of ordinary skill in the art having the benefit of the description herein.

DETAILED DESCRIPTION

The following detailed description of example implementations refers to the accompanying drawings. The same reference numbers in different drawings may identify the same or similar elements.

Barcodes are commonly used to provide and/or obtain information associated with certain objects (e.g., products, inventory, samples, supplies, consumables, and/or the like). For example, a barcode scanner can be used to decode a barcode that is attached to an object to permit a system (e.g., associated with an enterprise or organization) to obtain information associated with the object. Some barcode scanners may include manually controlled devices that are configured to be held by and/or attached to a user and triggered (e.g., using a button or other input device) by the user to scan a barcode. Other barcode scanners may include automated devices that can continuously monitor the environment and automatically scan detected barcodes when the barcodes are placed within a field of view of the barcode scanner. While such automated barcode scanners can facilitate hands-free use by the user, when multiple barcodes are simultaneously within the field of view, the automated barcode scanners may not be able to distinguish which barcodes are to be scanned at particular times or for particular objects. In other words, because the automated barcode scanners are configured to scan any or all detected barcodes (e.g., as soon as they are detected) certain desired information associated with the objects may not be discernible. Accordingly, when a particular barcode among a group of barcodes within an environment is to be scanned, a user needs to manually scan the barcode, typically requiring the use of one or more of the user's hands and/or arms to perform the scan (e.g., to manipulate a position and/or orientation of the barcode scanner and/or object). Previous techniques to manually scan the barcode inhibit a user's ability to perform one more activities and/or operations associated with scanning the barcodes and/or the objects (e.g., categorizing the object, using the object, moving the object, controlling another machine or device associated with the object, and/or the like).

Some implementations described herein provide a system that permits a barcode to be scanned and/or decoded using gesture detection. For example, as described herein, the user may perform one or more identifiable and/or designated gestures to indicate that a barcode is to be scanned, indicate the specific barcode that is to be scanned, and/or trigger the barcode scan. In some implementations, the system may include and/or utilize an image processing model to detect and/or recognize the gestures within an image stream. The image stream may include images, captured by a camera, that depict the user within an environment, along with barcodes that are to be scanned using the one or more gestures. The camera may be associated with a wearable user device (e.g., smart glasses or augmented reality glasses, a smart watch, or other type of wearable device). Accordingly, the system, as described herein, enables a user to scan individual barcodes within an environment without requiring the user to hold a manual barcode scanner, thereby improving the user's ability to perform one or more other activities (e.g., that involve the user's hands) because the user is not required to pick up and/or set down the manual barcode scanner between scans or perform the other activities while holding the manual barcode scanner. Moreover, the system, as described herein, reduces consumption of computing resources (e.g., processing resources, memory resources, and/or communication resources) that might otherwise be wasted by automated barcode scanners unnecessarily scanning barcodes (e.g., because the barcodes were not intended to be scanned or should not have been scanned) and processing and/or communicating data associated with the unnecessarily scanned barcodes.

FIG. 1 is a diagram of an example implementation 100 associated with barcode scanning based on gesture detection. As shown in FIG. 1, example implementation 100 includes a barcode data management system and a user device that includes a camera. In example implementation 100, the user device is shown as including smart glasses that are worn by a user in association with performing one or more gestures to scan a barcode, as described herein. Other example types of user devices may similarly be utilized, as described herein, to detect and/or analyze the gestures (e.g., a smartphone, a body camera/scanner, a smart watch, and/or the like).

The barcode data management system in the example of FIG. 1 may be a backend system that is associated with managing information associated with objects and/or decoded barcodes. For example, the barcode data management system may include a platform that manages inventory associated with the objects (e.g., for location, sorting, classifying, and/or the like), transactions associated with the objects (e.g., for purchase, sale, rent, and/or other types of transaction processing), transportation operations associated with the objects (e.g., for initiating shipments, routing shipments, and/or the like), labelling of the objects (e.g., for generating labels associated with the objects), and/or the like. Although the following description of example implementation 100 may refer to the user device performing one or more actions or operations associated with scanning a barcode based on gesture detection and/or gesture analysis, the backend management system may similarly be configured to perform one or more of the actions or operations.

As shown in FIG. 1, and by reference number 110, the user device obtains and/or processes an image stream of a camera. The image stream may be real-time image stream that includes a series of images depicting an environment of the user (e.g., from a point of view of the user) while the user is performing one or more activities associated with the objects. For example, the image stream may be captured by the camera of the user device in association with the user performing one or more operations associated with the objects. Further, the user device processes the image instream, as described herein, to monitor the environment of the user and/or the objects. More specifically, as described herein, the user device may process the image stream (e.g., in real-time) to identify a gesture of the user device and/or a barcode that may be decoded based on the gesture. In example implementation 100, the image stream includes Frame A and Frame B, which may be individual images of the image stream that are captured at different times while the user is performing one or more gestures associated with scanning one or more barcodes associated with the objects.

As described herein, the user device (and/or the barcode data management system) may utilize one or more image processing models to process the image stream. In some implementations, the user device may use a machine learning model (e.g., installed locally on the user device and/or on the barcode data management system) to detect and/or analyze one or more gestures of the user and/or one or more barcodes depicted in images captured by the camera. For example, the image processing model may include and/or utilize a computer vision technique to assist in classifying image data as including or not including one or more gestures and/or one or more barcodes described herein. In some cases, the image processing model may include a neural network (e.g., a convolutional neural network, a recurrent neural network, and/or the like) to implement the computer vision technique. The computer vision technique may include using an image recognition technique (e.g., an Inception framework, a ResNet framework, a Visual Geometry Group (VGG) framework, and/or the like) to detect one or more barcodes, an object detection technique (e.g., a Single Shot Detector (SSD) framework, a You Only Look Once (YOLO) framework, and/or the like) to detect a hand (or other body part) of the user that is performing a gesture, an object in motion technique (e.g., an optical flow framework and/or the like) to analyze the gesture, and/or the like.

An image processing model, as described herein, may be trained (e.g., by the barcode data management platform and/or by one or more other platforms associated with the barcode management platform) using historical data that is associated with detecting and analyzing one or more gestures and/or detecting and/or analyzing one or more barcodes based on historical values for one or more image parameters. Such image parameters may include gesture parameters (e.g., associated with positions or changes in positions of a user's hands or other body parts), barcode parameters (e.g., associated with appearances, such as shapes, sizes, types, and/or the like of various barcodes), and/or the like. Using the historical data and the image stream as inputs to the image processing model, the user device may detect a gesture and/or barcode to permit the barcode to be scanned based on the gesture, as described herein. In some implementations, the user device (and/or the barcode data management system) may retrain the image processing model by updating the historical data to include validated or invalidated results associated with whether the image processing model accurately or inaccurately detected, analyzed, and/or decoded a barcode as described herein (e.g., based on a user input and/or feedback from the user).

In this way, the image stream can be monitored to permit one or more gestures (e.g., of a particular set of gestures) of the user to be detected and/or analyzed and to permit one or more of the barcodes to be detected and/or decoded based on the one or more gestures.

As shown in FIG. 1, and by reference number 120, the user device detects an indication gesture in the image stream. For example, the indication gesture may be associated with the user indicating (e.g., by pointing toward) a barcode within the environment that is to be scanned (e.g., shown as a hand pointing to a specific barcode that is to be scanned). In FIG. 1, as shown in Frame A of the image stream, the user may perform an indication gesture to identify a particular barcode that is to be scanned. The indication gesture may be performed by placing the hand in an indication configuration. In example implementation 100, the user places the hand in the indication configuration by extending an index finger and/or thumb of the user's hand and closing the remaining fingers of the user's hand. However, other hand configurations may similarly be used to indicate or point out a barcode.

In some implementations, the user device (e.g., using the image processing model) may be configured to monitor the image stream for one or more gestures associated with scanning the barcode. The gesture may be detected based on detecting that an object (e.g., the user's hand or other body part) is depicted in a gesture region of the image stream. The gesture region may be within a foreground of the image stream that is detected and/or identified by performing a three-dimensional (3D) processing technique of the image processing model. Such a 3D processing technique may include one or more depth perception techniques that are based on pixel values of identified objects depicted in the environment (e.g., a monocular depth perception technique based on relative object size, interposition analysis, linear perspective analysis, aerial perspective analysis, lighting analysis, movement analysis, and/or the like). The gesture region and/or foreground of the image stream may be 3D zones of the image stream that correspond to zones of an environment that are various distances from the user. In this way, the image processing model may monitor the image stream to detect a gesture (e.g., the indication gesture) performed by the user in a 3D environment.

As described herein, when the user "performs a gesture," the user may place a hand in a particular configuration, place the hand in a particular location (e.g., relative to a location of a barcode and/or field of view of the camera), and/or move the hand and/or fingers of the hand in particular manner. Accordingly, one or more frames may be analyzed, as described herein, in connection with detecting that a user performed a gesture. As shown in Frame A of example implementation 100, the specific barcode associated with the indication gesture performed by the user is Barcode 1, which is associated with Object 1 (e.g., based on being attached to Object 1). Frame A may be an image that is associated with a section of the image stream that includes images depicting the user moving the hand within the field of view of the camera and/or within the line of sight of the barcode. Using the image processing model, the user device may detect the indication gesture based on identifying that Frame A depicts a hand in a configuration that is associated with an indication gesture and/or based on identifying that the section depicts the user moving the hand and configuring the hand in the indication configuration.

In this way, the user device may detect the indication gesture in order to permit the user device to identify a barcode and/or monitor for a trigger gesture associated with scanning and/or decoding the barcode.

As shown in FIG. 1, and by reference number 130, the user device identifies a barcode within a region associated with (e.g., indicated by) the indication gesture. For example, the user device, using the image processing model, may determine the barcode region based on a position of the user's hand when the gesture is performed. More specifically, as shown in Frame A and/or Frame B of FIG. 1, the user device may determine that the barcode region corresponds to an area of the image stream that includes an end of the user's index finger when placed in the indication configuration. In such a case, the image processing model may identify a pixel location of the user's index finger (e.g., a location of a pixel that depicts a portion of the tip of the user's index finger), and identify the barcode region of the image stream as a pixel area that includes the pixel location. The pixel area may be a particular size and/or shape that is preconfigured (e.g., as a default setting) and/or that is variable based on a determined or estimated distance between the barcode and the user's hand (e.g., as determined using a 3D processing technique associated with analyzing the user's hand and the barcode region as described herein).

In some implementations, the line of sight of the camera may similarly correspond to a line of sight of the user because the camera is mounted to smart glasses or another type of head-mounted scanner being worn by the user. In such an example, the user may perform the indication gesture to indicate that a barcode is to be scanned, without physically touching the barcode. Accordingly, the user can perform a gesture to scan a barcode that is outside of arm's reach of the user. In such a case, the barcode region may be determined to be in a background region of the image (e.g., a portion of the image that depicts a background environment of the user (e.g., an environment with a greater extent than an arm's length of the user)). The background region may be determined and/or identified based on the one or more 3D processing techniques described herein.

As described herein, the image processing model may utilize one or more image recognition techniques to identify a barcode within the barcode region associated with the indication gesture. For example, the image processing model may be trained to identify and/or detect one or more types of two-dimensional (2D) barcodes (e.g., parallel line barcodes, quick response (QR) codes, and/or the like) within an image that depicts a 3D environment. In some implementations, the image processing model may process the image to crop, extract, enhance, and/or the like the barcode region of Frame A to identify one or more portions of the barcode (e.g., a perimeter of the barcode). In some implementations, based on identifying the barcode, the user device may indicate the barcode and/or verify that the barcode is being selected by the user for a scan by augmenting an overlay associated with the barcode on a user interface (e.g., a display) of the user device (e.g., an augmented reality display that augments a barcode identifier (e.g., a transparent color or highlight) over the barcode via lenses of the smart glasses). In such a case, the user device may include augmented reality glasses that are configured to render information associated with detected barcodes and/or objects. For example, the user device may render an outline of detected barcodes within a field of view of the camera (e.g., using a character and/or object detection technique of the image processing). Therefore, the user device may be configured to permit the user to verify and/or validate that a particular barcode is to be scanned and/or decoded.

In this way, the user device may identify a barcode within a barcode region of the image stream to permit the user device to monitor for a trigger gesture and/or perform a scan of the barcode to permit the barcode to be decoded.

As shown in FIG. 1, and by reference number 140, the user device detects a trigger gesture in the image stream. For example, the trigger gesture may be associated with the user causing a scan of the barcode, to permit the barcode to be decoded. Similar to the detecting of the indication gesture, the user device may use the image processing model to detect the trigger gesture based on an analysis of Frame B of the image stream. The trigger gesture performed, by the user, in example implementation 100 may be associated with scanning Barcode 1, which is associated with Object 1 (e.g., based on being attached to Object 1). Frame B may be an image that is associated with a section of the image stream that includes images depicting the user, within the field of view of the camera and/or within the line of sight of the barcode, adjusting the hand relative to the indication gesture. Using the image processing model, the user device may detect the trigger gesture based on identifying that Frame B depicts a hand in a configuration that is associated with a trigger gesture and/or based on identifying that the section depicts the user transitioning the hand to the trigger configuration.

In FIG. 1, as shown in Frame B of the image stream, the user may perform a trigger gesture to cause a scan of the barcode. The trigger gesture may be performed by placing the hand in a trigger configuration. In example 100, the user places the hand in the trigger configuration by closing the index finger from the indication configuration (e.g., simulating a pull of a trigger). Accordingly, performance of the trigger configuration may include and/or be based on the user transitioning the hand from the indication configuration (e.g., with the user's index finger being in an extended position) to the trigger configuration (e.g., with the user's index finger being in a closed position). However, other hand configurations may similarly be used to cause the barcode to be scanned.

In this way, the user device may detect the trigger gesture and, correspondingly, determine that the user device is to scan and/or decode the barcode. In some implementations, the user device may identify the barcode within the barcode region, as described above, based on detecting the trigger gesture.

As shown in FIG. 1, and by reference number 150, the user device scans and/or decodes the barcode in the barcode region. In some implementations, the user device, when scanning a barcode, may obtain, process, and/or store a barcode image of the barcode from the image stream to permit the barcode to be decoded via the barcode image. For example, using a barcode scanning model (or application associated with one or image processing techniques to scan a barcode) the barcode image can be "scanned" from the image stream by copying and/or extracting the barcode from the image stream (e.g., using pixel values of Frame B that are used to depict the barcode) and/or formatting (e.g., enhancing, filtering, denoising, configuring, and/or the like) the barcode to permit the barcode to be decoded. In some implementations, the barcode scanning model may be trained to detect planar configurations of the barcode within a 3D environment (e.g., based on historical data associated with images of barcodes depicted in an environment from various angles). In such cases, the barcode scanning model may reconfigure and/or alter the extracted image of the barcode into a format that permits the user device to decode the barcode.

According to some implementations, the user device may cause a laser scanner to scan the barcode (e.g., a laser scanner of the user device, such as a laser emitter and/or light sensor on the smart glasses). In such a case, the user device may cause the laser scanner to scan the barcode by emitting light toward the barcode, and decode the barcode based on scan information associated with a light sensor measuring light reflected from the barcode.

The user device may decode the barcode using any suitable decoding techniques, which may be based on a type of the barcode (e.g., a parallel line barcode, a QR code, and/or the like). When decoding the barcode, barcode data may be generated that can be used to obtain, identify, and/or determine information associated with the object and/or in association with a configuration of the user device and the fact that the user device performed the scan. For example, the barcode data may include and/or represent identification information that is associated with a status of the object relative to an environment of the user device (e.g., information indicating whether the object available, received, and/or to be transported), location information (e.g., building location information, geographical coordinates, and/or the like) associated with the user device relative to the environment, transaction information (e.g., timing information, user information associated with the user, value information associated with the object, and/or the like), and/or user information (e.g., an identifier of the user, a location of the user, a role of the user, and/or the like) associated with the user (e.g., based on the user being logged in to or associated with the user device).

As described herein, the barcode region may be used to identify that a particular (or single) barcode in the environment is to be scanned. For example, although Barcode 2, associated with Object 2, may be within a field of view of the camera, and therefore within Frame A and Frame B, the user device may only scan Barcode 1 based on the trigger gesture because Barcode 2 is outside of the barcode region. According to some implementations, one or more gestures may be used by the user to indicate that multiple barcodes are to be scanned and/or decoded. For example, the user may perform a barcode boundary gesture that is associated with a boundary of the barcode region and, correspondingly, perform a multi-barcode trigger gesture to indicate that any or all barcodes within the boundary are to be scanned (e.g., simultaneously or sequentially).

In this way, the user device may perform a scan and/or decode the barcode to permit the user device and/or the barcode data management system to manage information associated with the barcode and/or the object.

As shown in FIG. 1, and by reference number 160, the user device obtains and/or provides information associated with the decoded barcode and/or the object associated with the barcode. For example, the user device may provide the status information, the location information, the transaction information, and/or the user information in association with and/or based on the decoding the barcode. Additionally, or alternatively, the user device may provide barcode data to the barcode data management system to permit the barcode data management system to determine and/or obtain the status information, the location information, the transaction information, and/or the user information.

In this way, the user device may perform one or more actions associated with the object and/or the barcode to enable information associated with the barcode and/or the object to be managed.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
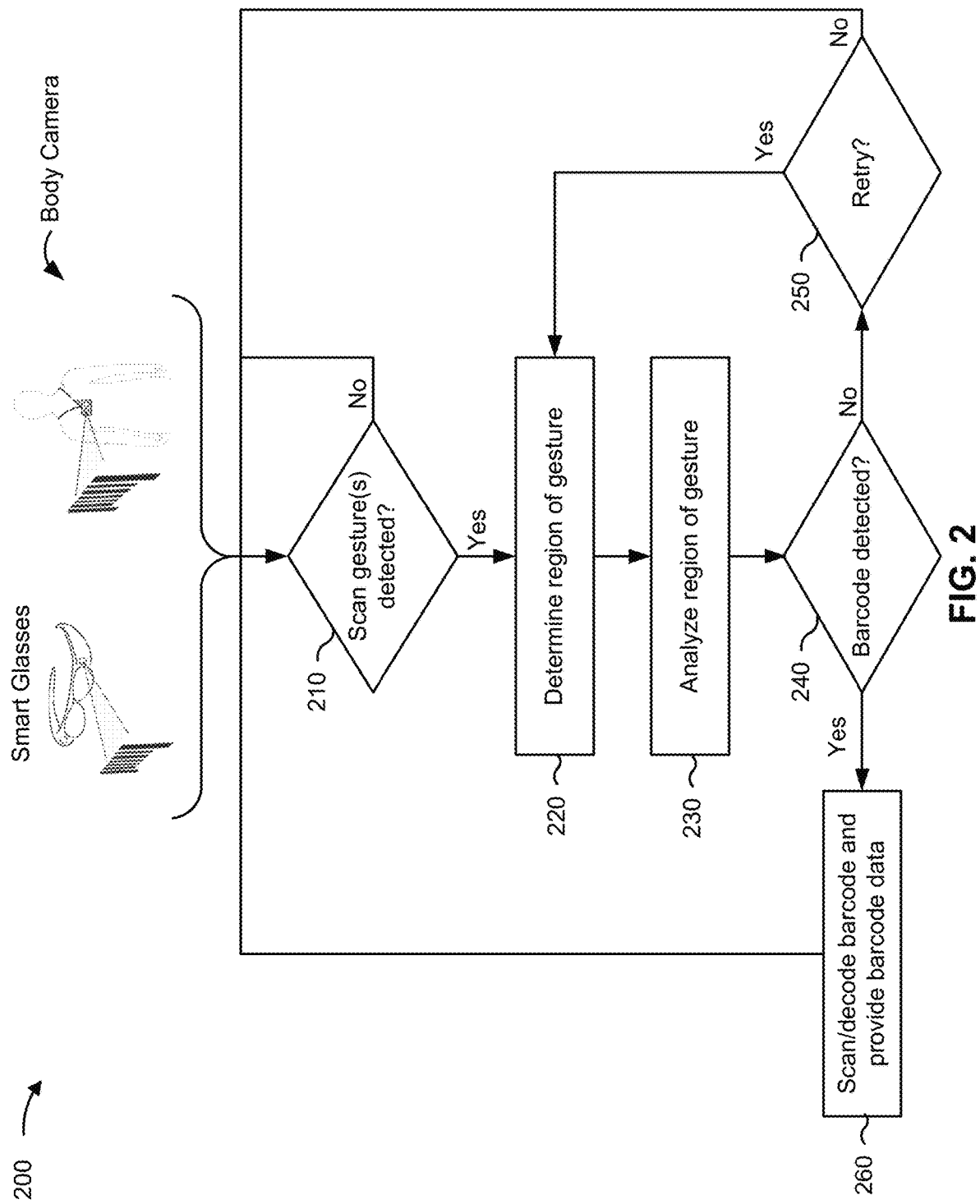
FIG. 2 is a diagram of another example implementation described herein.

FIG. 2 is a flowchart of an example process 200 that may be performed by an image processing model, such as the image processing model described in connection with example implementation 100. According to some implementations, the image processing model may be configured, trained, and/or utilized by the user device and/or the barcode data management system of FIG. 1. As shown in FIG. 2, the image processing model may receive an image stream from a user device (e.g., shown as smart glasses and/or a body camera) that is configured to scan one or more detected barcodes based on one or more gestures of a user.

As shown in FIG. 2, and in block 210, the image processing model may determine whether a scan gesture has been detected. For example, the image processing model may process images of an image stream to identify the indication gesture, the trigger gesture, and/or one or more combinations of gestures. If the image processing model does not detect a gesture, the image processing model may continue to monitor the image stream. If, at block 210, the image processing model detects a scan gesture, the image processing model, at block 220, determines a region of the gesture (e.g., the barcode region of example implementation of FIG. 1). At block 230, the image processing model (e.g., using an image recognition model, object detection model, barcode scanning model, and/or the like) analyzes the region of the gesture.

At block 240 of FIG. 2, the image processing model may determine whether a barcode is detected in the region. In some implementations, the image processing model may use a scoring system that is configured to determine a probability that the region includes a barcode that can be scanned. The scoring system may determine the probability based on whether the image includes certain shapes, lines, text, and/or the like that are indicative of the presence of a barcode. Based on the scoring system determining a score that indicates that the region likely does not include the barcode, the image processing model may determine, at block 250, whether to reanalyze the region (e.g., in subsequent frames of the image stream) to identify the barcode. For example, the image processing model may determine whether to retry identifying the barcode, based on the detected gesture, based on whether the image processing model analyzed one or more other frames of the image stream to identify the barcode and/or whether a quantity of frames of the image stream associated with the gesture have been analyzed to detect the barcode. In such a case, at block 250, if the image processing model has not analyzed a threshold quantity of frames of the image stream to identify a barcode based on the detected gesture, the image processing model may return to block 220 to determine a region of the gesture in another frame of the image stream. If the image processing model has analyzed the threshold quantity of frames, the image processing model may return to block 210 to detect another or different gesture. In some implementations, in such a case, the image processing model may cause the user device to alert the user that a barcode was not detected in association with the detected scan gesture.

If, at block 240, the image processing model does detect a barcode (that can be scanned), at block 260, the image processing model may perform one or more operations to scan and decode the barcode and/or provide barcode data associated with the barcode. For example, the image processing model may process the image to extract the barcode, format the barcode, or reconfigure and/or alter the barcode to permit the barcode to be decoded.

In this way, the image processing model may be configured to monitor an image stream to detect and/or identify one or more gestures to permit a barcode depicted in the image stream to be scanned.

As indicated above, FIG. 2 is provided as an example. Other examples may differ from what is described in connection with FIG. 2.

Figure 3:
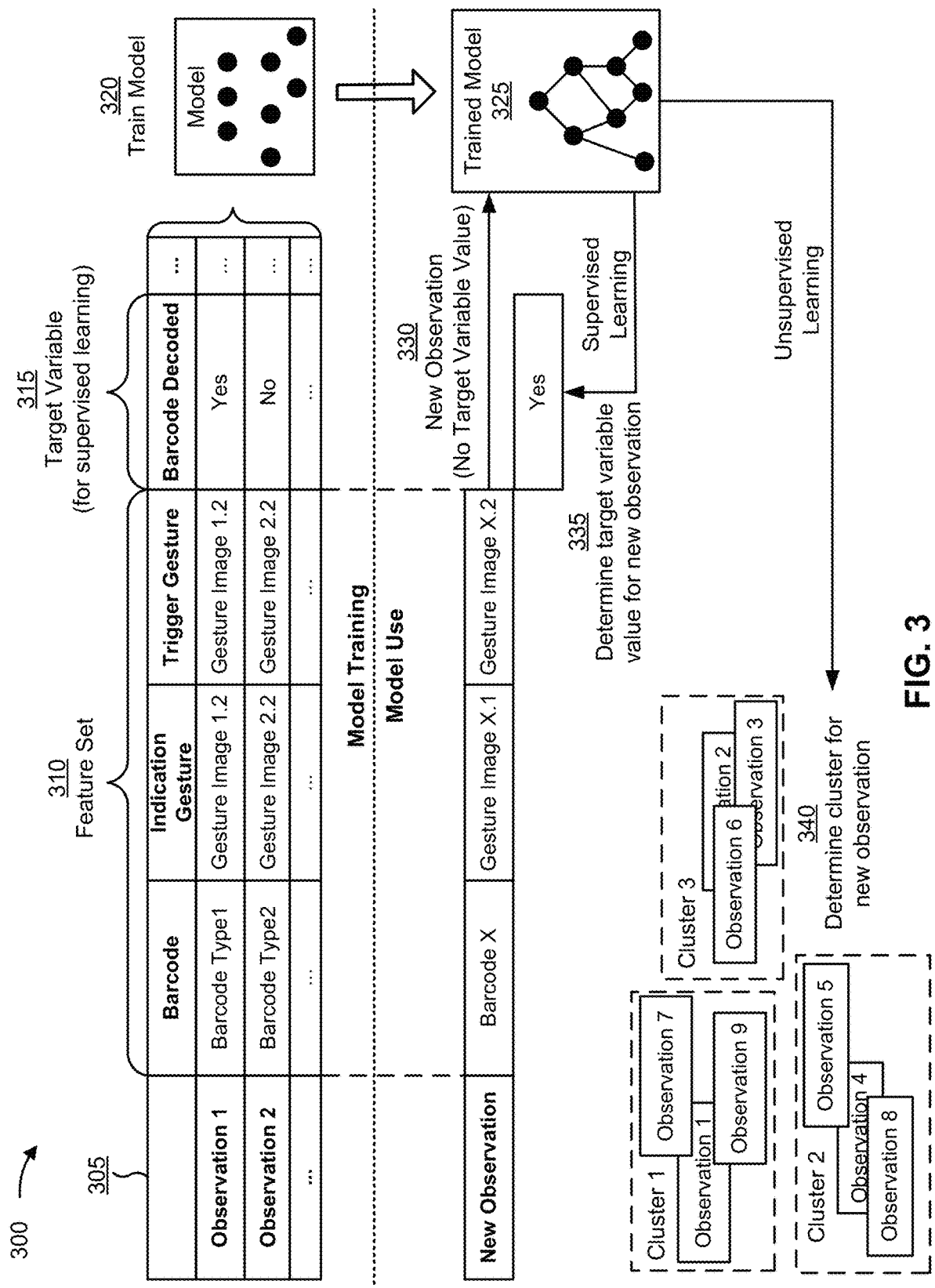
FIG. 3 is a diagram of another example implementation described herein.

FIG. 3 is a diagram illustrating an example 300 of training and using a machine learning model in connection with detecting and/or analyzing gestures of a user to decode and/or process barcodes as described herein. The machine learning model training and usage described herein may be performed using a machine learning system. The machine learning system may include or may be included in a computing device, a server, a cloud computing environment, and/or the like, such as the user device and/or the barcode data management system described in more detail elsewhere herein.

As shown by reference number 305, a machine learning model may be trained using a set of observations (e.g., associated with a set of image streams). The set of observations may be obtained from historical data, such as data gathered during one or more processes described herein. In some implementations, the machine learning system may receive the set of observations (e.g., as input) from the user device (e.g., to retrain the machine learning model), as described elsewhere herein.

As shown by reference number 310, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the user device (e.g., that was used by the user to cause a barcode to be scanned and/or decoded using one or more gestures, as described herein) and/or another similar user device (e.g., that was operated by the user or other users). For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature associated with a barcode (e.g., images of types of barcodes in the set of observations), a second feature associated with an indication gesture (e.g., images of indication gestures of the set of observations), a third feature associated with a trigger gesture (e.g., images of trigger gestures of the set of observations), and so on. As shown, for a first observation, the first feature may have a value of Barcode Type1 (e.g., image data associated with an image depicting a first type of barcode), the second feature may have a value of Gesture Image 1.1 (e.g., image data associated with an image depicting a first indication gesture), the third feature may have a value of Gesture Image 1.2 (e.g., image data associated with an image depicting a first trigger gesture), and so on. These features and feature values are provided as examples, and may differ in other examples. For example, the feature set may include one or more of the following features: other types of gestures, whether the image includes multiple barcodes, parameters associated with the images (e.g., resolution, sizes, aspect ratios, and/or the like), timing associated with gesture performance, a user device or camera associated with capturing images or image streams of the observations, and/or the like.

As shown by reference number 315, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, labels, and/or the like), may represent a variable having a Boolean value, and/or the like. A target variable may be associated with a target variable value, and a target variable value may be specific to an observation. In example 300, the target variable is decode scan indicator, which has a value of "Yes" for the first observation and "No" for the second observation, indicating that a barcode was scanned in the first observation and that a barcode was not scanned in the second observation. In some implementations, the target variable may be associated with a score representing a probability that a barcode of the observations was to be scanned in association with the indication gesture and/or trigger gesture identifying a barcode and/or triggering a barcode scan, as described herein. For example, a scoring system may be configured based on a confidence level that is determined with respect to the indication gestures and/or trigger gestures being accurately detected and analyzed and/or a confidence level that is determined with respect to the barcodes being accurately identified and/or decoded in association with the scans. Accordingly, a "Yes" may be associated with the scoring system calculating a score that satisfies a threshold probability and a "No" may be associated with the scoring system calculating a score that does not satisfy the threshold probability.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 320, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 325 to be used to analyze new observations.

As shown by reference number 330, the machine learning system may apply the trained machine learning model 325 to a new observation, such as by receiving a new observation and inputting the new observation to the trained machine learning model 325. As shown, the new observation may include a first feature associated with a barcode, a second feature associated with an indication gesture, a third feature associated with a trigger gesture, and so on, as an example. The machine learning system may apply the trained machine learning model 325 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 325 may predict a value of "Yes" for the target variable of barcode decoded for the new observation (e.g., based on a threshold score being satisfied), as shown by reference number 335. Based on this prediction, the machine learning system may provide a first recommendation, may provide output for determination of a first recommendation, may perform a first automated action, may cause a first automated action to be performed (e.g., by instructing another device to perform the automated action), and/or the like. The first recommendation may include, for example, a recommendation to the user to perform the scan, a recommendation that the user validate the barcode scan, and/or the like. The first automated action may include, for example, automatically scanning the barcode, automatically providing barcode data associated with decoding the barcode via the barcode scan, providing information associated with an object that is associated with the barcode (e.g., information identifying a status, a location, a transaction, a user, and/or the like associated with the object and/or the user device), and/or the like.

As another example, if the machine learning system were to predict a value of "No" for the target variable of barcode decoded (e.g., based on the threshold score not being satisfied), then the machine learning system may provide a second (e.g., different) recommendation (e.g., indicate that the barcode cannot be scanned, and/or the like) and/or may perform or cause performance of a second (e.g., different) automated action (e.g., ignore detected barcode, retrain the model, and/or the like).

In some implementations, the trained machine learning model 325 may classify (e.g., cluster) the new observation in a cluster, as shown by reference number 340. The observations within a cluster may have a threshold degree of similarity. As an example, if the machine learning system classifies the new observation in a first cluster (e.g., a cluster that indicates that a barcode is in the observation), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a cluster that includes a barcode and at least one of an indication gesture or a trigger gesture), then the machine learning system may provide a second (e.g., different) recommendation (e.g., highlight the barcode associated with the gesture) and/or may perform or cause performance of a second (e.g., different) automated action, such as scan the barcode and/or decode the barcode.

In some implementations, the recommendation and/or the automated action associated with the new observation may be based on a target variable value having a particular label (e.g., classification, categorization, and/or the like), may be based on whether a target variable value satisfies one or more threshold (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to detect and/or analyze one or more gestures associated with identifying and/or scanning a barcode. The machine learning system enables recognition and/or identification of tens, hundreds, thousands, or millions of features and/or feature values for tens, hundreds, thousands, or millions of observations, thereby increasing accuracy and consistency and reducing delay associated with identifying which barcode is to be scanned, providing barcode data associated with decoding the scanned barcode, and/or the like relative to requiring computing resources to be allocated for barcode scanners that scan any or all barcodes that are detected using the barcode feature.

As indicated above, FIG. 3 is provided as an example. Other examples may differ from what is described in connection with FIG. 3.

Figure 4:
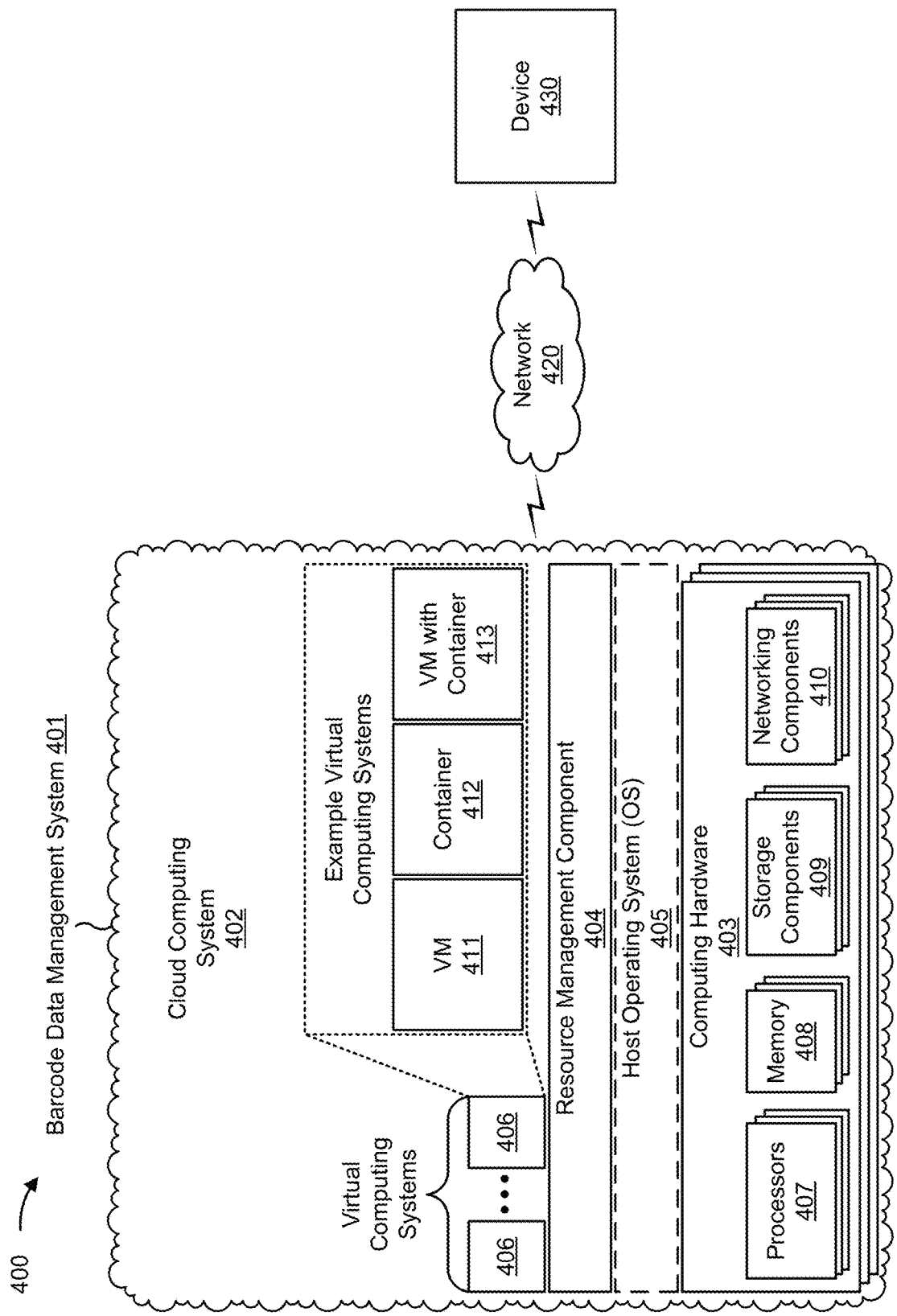
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a barcode data management system 401, which may include one or more elements of and/or may execute within a cloud computing system 402. The cloud computing system 402 may include one or more elements 403-413, as described in more detail below. As further shown in FIG. 4, environment 400 may include a network 420, and/or a user device 430. Devices and/or elements of environment 400 may interconnect via wired connections and/or wireless connections.

The cloud computing system 402 includes computing hardware 403, a resource management component 404, a host operating system (OS) 405, and/or one or more virtual computing systems 406. The resource management component 404 may perform virtualization (e.g., abstraction) of computing hardware 403 to create the one or more virtual computing systems 406. Using virtualization, the resource management component 404 enables a single computing device (e.g., a computer, a server, and/or the like) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, one or more storage components 409, and/or one or more networking components 410. Examples of a processor, a memory, a storage component, and a networking component (e.g., a communication component) are described elsewhere herein.

The resource management component 404 includes a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, and/or the like) or a virtual machine monitor, such as when the virtual computing systems 406 are virtual machines 411. Additionally, or alternatively, the resource management component 404 may include a container manager, such as when the virtual computing systems 406 are containers 412. In some implementations, the resource management component 404 executes within and/or in coordination with a host operating system 405.

A virtual computing system 406 includes a virtual environment that enables cloud-based execution of operations and/or processes described herein using computing hardware 403. As shown, a virtual computing system 406 may include a virtual machine 411, a container 412, a hybrid environment 413 that includes a virtual machine and a container, and/or the like. A virtual computing system 406 may execute one or more applications using a file system that includes binary files, software libraries, and/or other resources required to execute applications on a guest operating system (e.g., within the virtual computing system 406) or the host operating system 405.

Although the barcode data management system 401 may include one or more elements 403-413 of the cloud computing system 402, may execute within the cloud computing system 402, and/or may be hosted within the cloud computing system 402, in some implementations, the barcode data management system 401 may not be cloud-based (e.g., may be implemented outside of a cloud computing system) or may be partially cloud-based. For example, the barcode data management system 401 may include one or more devices that are not part of the cloud computing system 402, such as the barcode data management system of FIG. 1, which may include a standalone server or another type of computing device. The barcode data management system 401 may perform one or more operations and/or processes described in more detail elsewhere herein.

Network 420 includes one or more wired and/or wireless networks. For example, network 420 may include a cellular network, a public land mobile network (PLMN), a local area network (LAN), a wide area network (WAN), a private network, the Internet, and/or the like, and/or a combination of these or other types of networks. The network 420 enables communication among the devices of environment 400.

The user device 430 includes one or more devices capable of receiving, generating, storing, processing, and/or providing information associated with barcode scanning based on gesture detection and/or analysis, as described elsewhere herein. The user device 430 may include a communication device and/or a computing device. For example, the user device 430 may include a wireless communication device, a user equipment (UE), a mobile phone (e.g., a smart phone or a cell phone, among other examples), a tablet computer, a handheld computer, a wearable communication device (e.g., a smart wristwatch or a pair of smart glasses, among other examples), an Internet of Things (IoT) device, or a similar type of device. The user device 430 may communicate with one or more other devices of environment 400, as described elsewhere herein.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
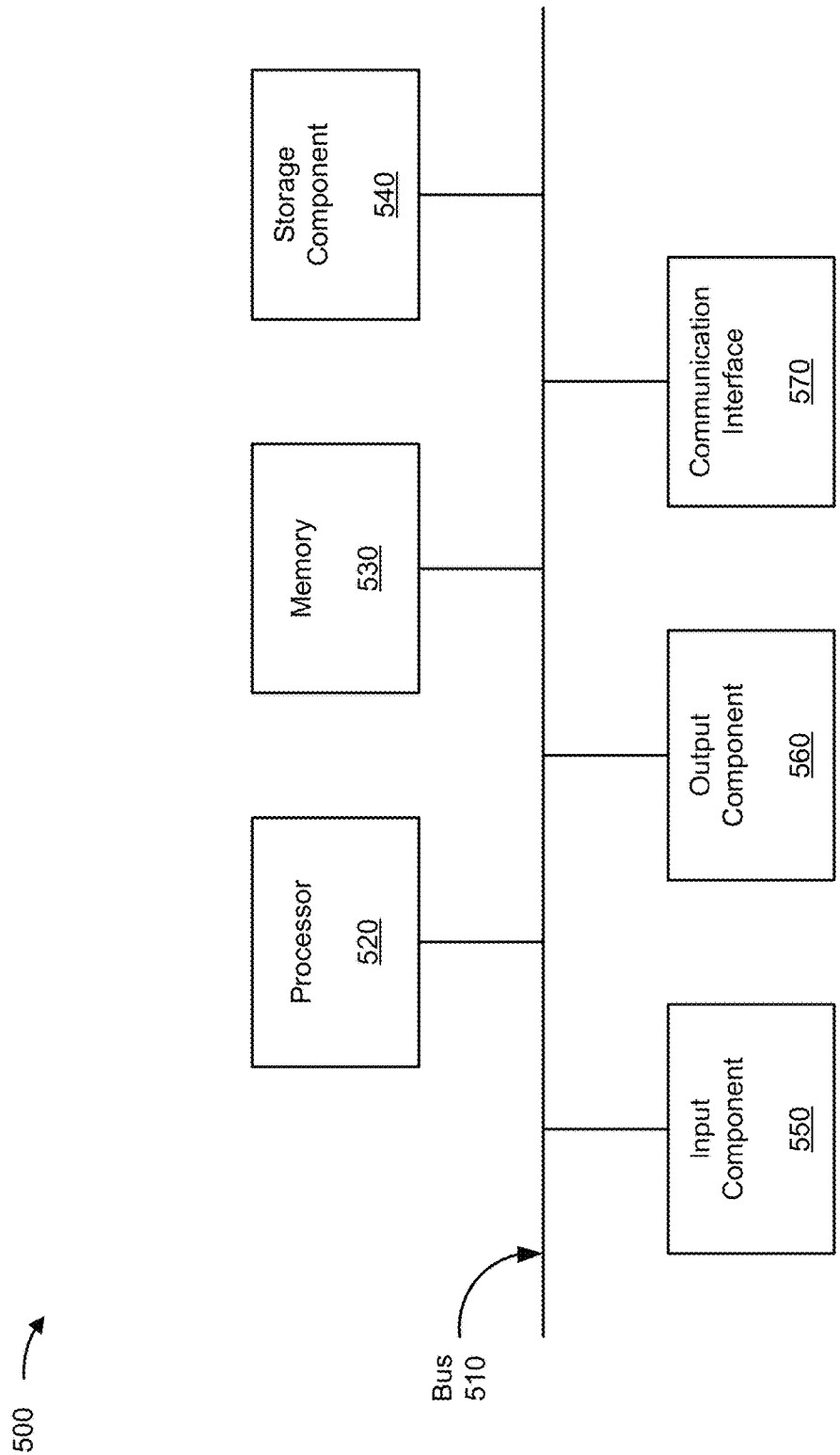
FIG. 5 is a diagram of example components of one or more devices of FIG. 4.

FIG. 5 is a diagram of example components of a device 500, which may correspond to barcode data management system 401 and/or user device 430. In some implementations, barcode data management system 401 and/or user device 430 may include one or more devices 500 and/or one or more components of device 500. As shown in FIG. 5, device 500 may include a bus 510, a processor 520, a memory 530, a storage component 540, an input component 550, an output component 560, and a communication component 570.

Bus 510 includes a component that enables wired and/or wireless communication among the components of device 500. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform a function. Memory 530 includes a random access memory), a read only memory, and/or another type of memory (e.g., a flash memory, a magnetic memory, and/or an optical memory).

Storage component 540 stores information and/or software related to the operation of device 500. For example, storage component 540 may include a hard disk drive, a magnetic disk drive, an optical disk drive, a solid state disk drive, a compact disc, a digital versatile disc, and/or another type of non-transitory computer-readable medium. Input component 550 enables device 500 to receive input, such as user input and/or sensed inputs. For example, input component 550 may include a touch screen, a keyboard, a keypad, a mouse, a button, a microphone, a switch, a sensor, a global positioning system component, an accelerometer, a gyroscope, an actuator, and/or the like. Output component 560 enables device 500 to provide output, such as via a display, a speaker, and/or one or more light-emitting diodes. Communication component 570 enables device 500 to communicate with other devices, such as via a wired connection and/or a wireless connection. For example, communication component 570 may include a receiver, a transmitter, a transceiver, a modem, a network interface card, an antenna, and/or the like.

Device 500 may perform one or more processes described herein. For example, a non-transitory computer-readable medium (e.g., memory 530 and/or storage component 540) may store a set of instructions (e.g., one or more instructions, code, software code, program code, and/or the like) for execution by processor 520. Processor 520 may execute the set of instructions to perform one or more processes described herein. In some implementations, execution of the set of instructions, by one or more processors 520, causes the one or more processors 520 and/or the device 500 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
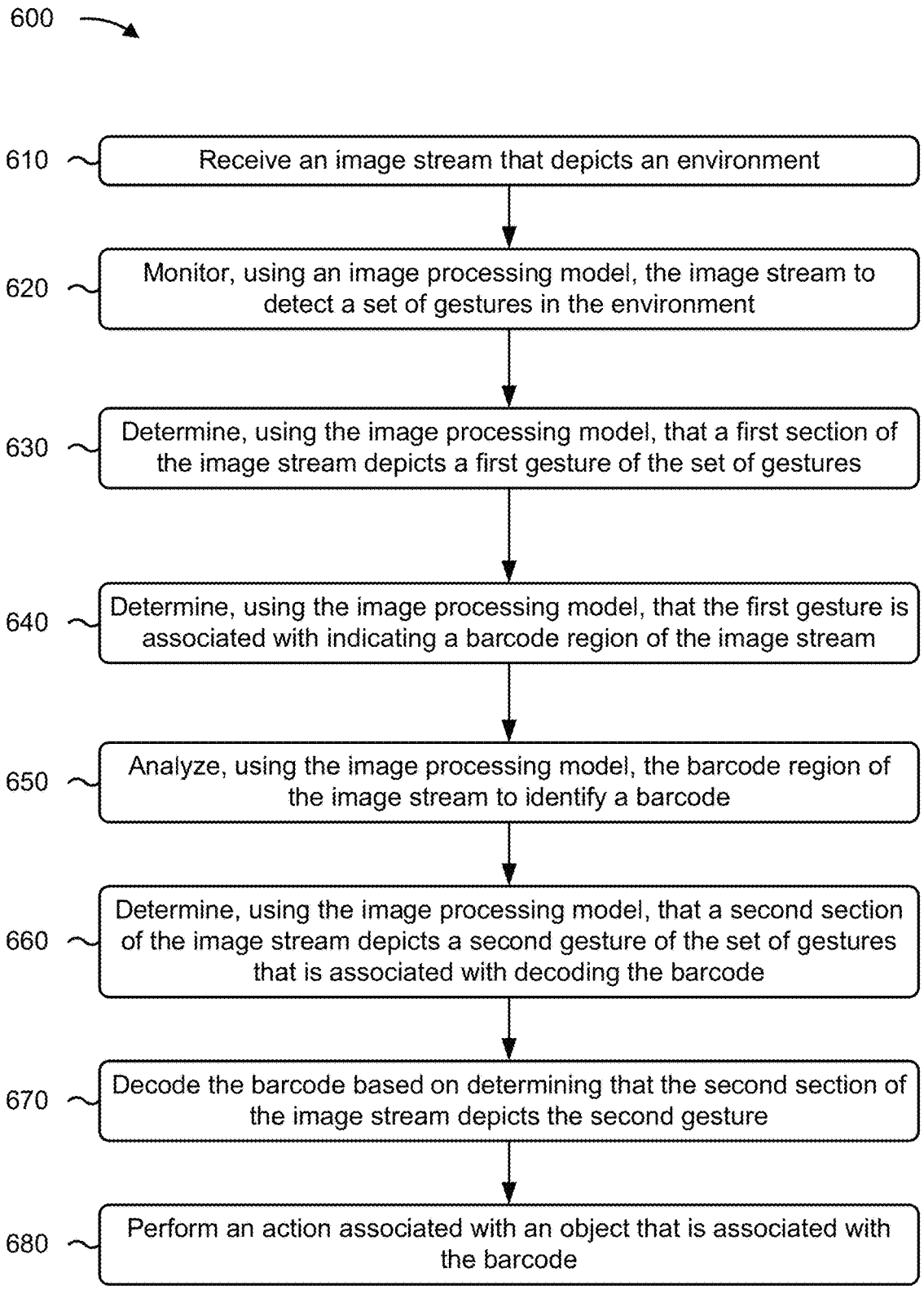
FIG. 6 is a flowchart of an example process relating to barcode scanning based on gesture detection and analysis.

FIG. 6 is a flowchart of an example process 600 associated with barcode scanning based on gesture detection and analysis. In some implementations, one or more process blocks of FIG. 6 may be performed by a user device (e.g., user device 430). In some implementations, one or more process blocks of FIG. 6 may be performed by another device or a group of devices separate from or including the user device, such as barcode data management system 401 and/or the like. Additionally, or alternatively, one or more process blocks of FIG. 6 may be performed by one or more components of a device 500, such as processor 520, memory 530, storage component 540, input component 550, output component 560, communication component 570, and/or the like.

As shown in FIG. 6, process 600 may include receiving an image stream that depicts an environment (block 610). For example, the user device may receive an image stream that depicts an environment, as described above.

As further shown in FIG. 6, process 600 may include monitoring, using an image processing model, the image stream to detect a set of gestures in the environment (block 620). For example, the user device may monitor, using an image processing model, the image stream to detect a set of gestures in the environment, as described above.

As further shown in FIG. 6, process 600 may include determining, using the image processing model, that a first section of the image stream depicts a first gesture of the set of gestures (block 630). For example, the user device may determine, using the image processing model, that a first section of the image stream depicts a first gesture of the set of gestures, as described above.

As further shown in FIG. 6, process 600 may include determining, using the image processing model, that the first gesture is associated with indicating a barcode region of the image stream (block 640). For example, the user device may determine, using the image processing model, that the first gesture is associated with indicating a barcode region of the image stream, as described above.

As further shown in FIG. 6, process 600 may include analyzing, using the image processing model, the barcode region of the image stream to identify a barcode (block 650). For example, the user device may analyze, using the image processing model, the barcode region of the image stream to identify a barcode, as described above.

In some implementations, analyzing the barcode region comprises: identifying a position of a user member that performed of the first gesture; determining that the barcode region corresponds to an area of the environment that is depicted within a threshold distance of the position of the user member, and identifying the barcode within the barcode region based on the barcode being depicted within the threshold distance. Additionally, or alternatively, the barcode is identified based on the image processing model being configured to: identify that the image stream depicts the barcode based on planar configurations of other barcodes that are associated with the barcode, and process the barcode region based on determining that the barcode is depicted in association with one of the planar configurations.

As further shown in FIG. 6, process 600 may include determining, using the image processing model, that a second section of the image stream depicts a second gesture of the set of gestures that is associated with decoding the barcode (block 660). For example, the user device may determine, using the image processing model, that a second section of the image stream depicts a second gesture of the set of gestures that is associated with decoding the barcode, as described above.

In some implementations, the second gesture is associated with a gesture movement that corresponds to a user transitioning a user member from a gesture position of the first gesture to a gesture position of the second gesture.

As further shown in FIG. 6, process 600 may include decoding the barcode based on determining that the second section of the image stream depicts the second gesture (block 670). For example, the user device may decode the barcode based on determining that the second section of the image stream depicts the second gesture, as described above.

In some implementations, decoding the barcode comprises: causing a laser scanner to scan the barcode, and processing scan information (e.g., barcode data) received from the laser scanner to decode the barcode. Additionally, or alternatively, decoding the barcode comprises: processing, using the image processing model, the barcode region to extract an image of the barcode from the image stream; formatting, using a barcode scanning model, the image for decoding to form a formatted image, and decoding, using the barcode scanning model, the barcode based on the formatted image.

As further shown in FIG. 6, process 600 may include performing an action associated with an object that is associated with the barcode (block 680). For example, the user device may perform an action associated with an object that is associated with the barcode, as described above. In some implementations, performing the action comprises at least one of: providing status information associated with the object relative to the environment, providing location information associated with the object relative to the environment, providing transaction information associated with the object relative to the environment, and providing user information associated with a user processing the object.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In the foregoing disclosure, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present disclosure. Additionally, the described embodiments/examples/implementations should not be interpreted as mutually exclusive, and should instead be understood as potentially combinable if such combinations are permissive in any way. In other words, any feature disclosed in any of the aforementioned examples or implementations may be included in any of the other aforementioned examples or implementations.

As used herein, the term "component" is intended to be broadly construed as hardware, firmware, and/or a combination of hardware and software. As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, or the like) on which machine-readable instructions (e.g., code in the form of, for example, software and/or firmware) can be stored. The instructions may be stored for any suitable duration of time, such as permanently, for an extended period of time (e.g., while a program associated with the instructions is executing), or for a short period of time (e.g., while the instructions are cached, during a buffering process, or the like). Further, as used herein, each of the terms "tangible machine-readable medium," "non-transitory machine-readable medium" and "machine-readable storage device" is expressly defined to exclude propagating signals. That is, as used in any claim herein, a "tangible machine-readable medium," a "non-transitory machine-readable medium," and a "machine-readable storage device," or the like, should not be interpreted as being implemented as a propagating signal.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, as used herein, relational terms such as first and second, top and bottom, or the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

The terms "a" and "an" are defined as one or more unless explicitly stated otherwise herein. Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

The abstract of the disclosure is provided to allow the reader to quickly ascertain the nature of the technical disclosure. It is submitted with the understanding that it will not be used to interpret or limit the scope or meaning of the claims. In addition, in the foregoing description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A method, comprising:
    receiving, by a device, an image stream that depicts an environment;
    monitoring, by the device and using an image processing model, the image stream to detect a set of gestures in the environment;
    determining, by the device and using the image processing model, that a first section of the image stream depicts a first gesture of the set of gestures;
    determining, by the device and using the image processing model, that the first gesture is associated with indicating a barcode region of the image stream;
    analyzing, by the device and using the image processing model, the barcode region of the image stream to identify a barcode;
    determining, by the device and using the image processing model, that a second section of the image stream depicts a second gesture of the set of gestures that is associated with decoding the barcode;
    decoding, by the device, the barcode based on determining that the second section of the image stream depicts the second gesture; and
    performing, by the device, an action associated with an object that is associated with the barcode.

2. The method of claim 1, wherein analyzing the barcode region comprises:
    identifying a position of a user member that performed of the first gesture;
    determining that the barcode region corresponds to an area of the environment that is depicted within a threshold distance of the position of the user member; and
    identifying the barcode within the barcode region based on the barcode being depicted within the threshold distance.

3. The method of claim 1, wherein the barcode is identified based on the image processing model being configured to:
    identify that the image stream depicts the barcode based on planar configurations of other barcodes that are associated with the barcode; and
    process the barcode region based on determining that the barcode is depicted in association with one of the planar configurations.

4. The method of claim 1, wherein the second gesture is associated with a gesture movement that corresponds to a user transitioning a user member from a gesture position of the first gesture to a gesture position of the second gesture.

5. The method of claim 1, wherein decoding the barcode comprises:
    causing a laser scanner to scan the barcode; and
    processing scan information received from the laser scanner to decode the barcode.

6. The method of claim 1, wherein decoding the barcode comprises:
    processing, using the image processing model, the barcode region to extract an image of the barcode from the image stream;
    formatting, using a barcode scanning model, the image for decoding to form a formatted image; and decoding, using the barcode scanning model, the barcode based on the formatted image.

7. The method of claim 1, wherein performing the action comprises at least one of:
providing status information associated with the object relative to the environment,
providing location information associated with the object relative to the environment,
providing transaction information associated with the object relative to the environment, and
providing user information associated with a user processing the object.

8. A device, comprising:
one or more memories; and
one or more processors, communicatively coupled to the one or more memories, configured to:
receive an image stream that depicts an environment;
monitor, using an image processing model, the image stream to detect a set of gestures in the environment;
determine, using the image processing model, that a first section of the image stream depicts a first gesture of the set of gestures;
determine, using the image processing model, that the first gesture is associated with indicating a barcode region of the image stream;
analyze, using the image processing model, the barcode region of the image stream to identify a barcode that is in the environment;
determine, using the image processing model, that a second section of the image stream depicts a second gesture of the set of gestures that is associated with decoding the barcode; and
decode the barcode based on the image stream depicting the second gesture.

9. The device of claim 8, wherein the one or more processors, when analyzing the barcode region, are configured to:
determine the barcode region based on a position of a user member that performed of the first gesture;
determine that the barcode region corresponds to an area of the environment that is depicted within a threshold distance of the position of the user member; and
identify the barcode within the barcode region based on the barcode being within the threshold distance.

10. The device of claim 8, wherein the barcode is identified based on the image processing model being configured to:
identify that the image stream depicts the barcode based on a format of the barcode; and
process the barcode region based on the format of the barcode to verify that the barcode region depicts the barcode,
wherein the barcode is decoded based on the barcode region being processed to verify that the barcode region depicts the barcode.

11. The device of claim 8,
wherein the image processing model is configured to:
detect the set of gestures in a foreground of the image stream, and
identify the barcode in a background of the image stream.

12. The device of claim 8, wherein the one or more processors, prior to determining that the second section depicts the second gesture, are configured to:
augment a barcode identifier in association with the barcode via a display of a user interface that is associated with the environment.

13. The device of claim 8,
wherein the one or more processors, when decoding the barcode, are configured to:
process, using the image processing model, the barcode region to extract an image of the barcode from the image stream; and
decode, using a barcode scanning model, the barcode based on the image of the barcode.

14. The device of claim 8, wherein the one or more processors are further configured to:
perform, based on decoding the barcode, an action associated with an object,
wherein the object is associated with the barcode, and
wherein the one or more processors, when performing the action, are configured to at least one of:
provide status information associated with the object relative to the environment,
provide location information associated with the object relative to the environment,
provide transaction information associated with the object relative to the environment, and
provide user information associated with a user processing the object.

15. A tangible machine-readable medium storing instructions, the instructions comprising:
one or more instructions that, when executed by one or more processors of a device, cause the device to:
receive an image stream of an environment;
determine, based on processing images of the image stream, a gesture region of the image stream;
detect a gesture, by a user, based on analyzing the gesture region;
determine a barcode region of the image stream based on a position of the user when performing the gesture;
identify a barcode in the environment based on analyzing the barcode region; and
decode the barcode based on a format of the barcode.

16. The tangible machine-readable medium of claim 15, wherein the gesture region is determined based on the images depicting a user member of the user in a foreground of the image stream.

17. The tangible machine-readable medium of claim 15, wherein the barcode region is determined based on the barcode region being in a background, relative to the gesture region, of the image stream.

18. The tangible machine-readable medium of claim 15, wherein the gesture region and the barcode region correspond to three-dimensional zones of the image stream, and wherein the format of the barcode corresponds to a two-dimensional depiction of the barcode within the barcode region.

19. The tangible machine-readable medium of claim 15,
wherein the one or more instructions, that cause the one or more processors to decode the barcode, cause the one or more processors to at least one of:
decode the barcode using at least one of:
a laser scan of the barcode; and
a barcode scanning model that utilizes an image processing technique to decode the barcode using an image from the image stream.

20. The tangible machine-readable medium of claim 15, wherein the one or more instructions, when executed by the one or more processors, further cause the one or more processors to at least one of:
provide status information associated with an object that is associated with the barcode,
provide location information associated with the object, provide transaction information associated with the object, and provide user information associated with the user and the object.

* * * * *